United States Patent [19]

Kawai

[11] Patent Number: 4,922,782
[45] Date of Patent: May 8, 1990

[54] MANIPULATOR SHOULDER MECHANISM
[75] Inventor: Seiji Kawai, Gifu, Japan
[73] Assignees: Doryokuro Kakunenryo Kaihatsu Jigyodan; Kabushiki Kaisha Meidensha, both of Tokyo, Japan
[21] Appl. No.: 907,974
[22] Filed: Sep. 16, 1986
[51] Int. Cl.$^5$ ............................................. B25J 9/06
[52] U.S. Cl. ............................ 74/479; 29/157.3 R; 29/402.08; 29/723; 29/890.031; 310/71; 310/114; 901/8; 901/23; 901/25; 901/26; 901/27
[58] Field of Search ............... 74/479; 310/71, 114; 29/157.3 R, 402.08, 722, 723; 901/8, 23, 24, 25, 26, 27, 29

[56] References Cited

U.S. PATENT DOCUMENTS

| | | | |
|---|---|---|---|
| 2,512,407 | 6/1950 | Wood | 310/71 X |
| 2,922,054 | 1/1960 | Miller | 310/71 |
| 3,451,224 | 6/1969 | Lolechia et al. | 901/8 X |
| 3,923,166 | 12/1975 | Fletcher et al. | 901/29 X |
| 4,062,455 | 12/1977 | Flatau | 901/26 X |
| 4,068,763 | 1/1978 | Fletcher et al. | 901/8 X |
| 4,252,360 | 2/1981 | Gallagher, Jr. | 901/8 X |
| 4,460,302 | 7/1984 | Moreau et al. | 414/5 |
| 4,623,294 | 11/1986 | Schroder | 901/8 |

FOREIGN PATENT DOCUMENTS 1142949  1/1963  Fed. Rep. of Germany ........ 310/71

Primary Examiner—Allan D. Herrmann
Attorney, Agent, or Firm—Bachman & LaPointe

[57] ABSTRACT

In a two-arm type manipulator, it is very rare that two arms develop trouble simultaneously due to malfunction of motors and/or cables. In view of the above fact, motors for actuating manipulator joint mechanisms and cables connected between the motors and the manipulator frame are removably mounted on the shoulder section of the frame of the manipulator. Further, the first arm is so arranged as to be accessible to the second shoulder section or the second arm is so arranged as to be accessible to the first shoulder section. Therefore, it is possible to allow an access of one manipulator arm to the other disabled manipulator elements (motors and/or cables) for removal and replacement of the disabled elements with new elements without aid of another manipulator, in particular, where the manipulator is equipped in atomic facilities which refuse access, thus saving equipment investment.

7 Claims, 4 Drawing Sheets

MANIPULATOR SHOULDER MECHANISM

BACKGROUND OF THE INVENTION

1. Field of the Invention

The present invention relates to manipulator shoulder mechanism and more specifically to a pair of shoulder mechanisms provided for a self-maintenance type two-arm manipulator equipped in atomic energy facilities, for instance, which are always in danger of radioactivity contamination whenever an operator or a repair man has access thereto.

2. Description of the Prior Art

In the two-arm manipulator, in usual a plurality of power units such as motors are mounted on each of both the right hand and left hand shoulder sections of a slave manipulator in order to actuate plural joints corresponding to shoulder, elbow, wrist, etc. by the operation of a master manipulator. Since these motors are frequently driven and then stopped repeatedly and plural lead wire cables connected between the movable shoulder sections and a fixed frame are frequently transformed by the operation of the manipulator, bent or twisted, the motors often develop trouble and the lead wire cables are often damaged into disconnection. However, the damaged motors and cables are not easily removed and replaced with new ones because radioactive contamination makes dangerous a direct human access thereto and further the manipulator itself cannot remove and replace the damaged parts, it has been necessary to use another manipulator in order to remove and replace a defective motor or a defective lead wire cable with a new one, where the manipulator is equipped in a dangerous zone which refuses human access, thus resulting in a problem such that an additional equipment investment is required for maintenance of the manipulator.

SUMMARY OF THE INVENTION

With these problems in mind, therefore, it is the primary object of the present invention to provide a manipulator shoulder mechanism of self-maintenance type by which a disabled motor or a disconnected cable can be removed and replaced with a new one without the aid of another manipulator.

The gist of the present invention is based upon the fact that in a two-arm manipulator, it is very rare that two arms develop trouble simultaneously due to malfunction of motors and/or cables; in other words, either one of the two arms is usually manipulatable. Therefore, a disabled element of one arm is readily replaced with a new one by manipulating the other normal arm of the manipulator.

To achieve the above-mentioned object, the two-arm manipulator provided with first and second shoulder mechanisms mounted on a frame for manipulating first and second manipulator arms independently according to the present invention, each of the shoulder mechanisms having at least one power unit for actuating at least one joint mechanism arranged in the shoulder mechanism, characterized in that the at least one power unit is removably mounted on the shoulder mechanism and that the first arm is accessible to the second shoulder mechanism and the second arm is accessible to the first shoulder mechanism, respectively.

The above power unit is removably linked to the shoulder mechanism via a gear clutch. The power unit is a motor and the shoulder mechanism linked to the motor is a power transmission mechanism arranged within an upper arm section of the manipulator.

Further, at least one lead wire cable is removably connected between the motor and the frame via a detachable connector.

In the two-arm manipulator according to the present invention, since each motor and each lead wire cable are removably attached onto the shoulder section, in case any one of the motors or cables develops trouble, it is possible to allow an access of one manipulator arm to the other disabled manipulator elements for removal and replacement of a disabled element with a new normal element. The manipulator is advantageously equipped in atomic facilities which refuse human access.

BRIEF DESCRIPTION OF THE DRAWINGS

The features and advantages of the shoulder mechanism of a two-arm manipulator according to the present invention will be more clearly appreciated from the following description of the preferred embodiment of the invention taken in conjunction with the accompanying drawings in which like reference numerals designate the same or similar elements throughout the figures thereof and in which.

DETAILED DESCRIPTION OF THE PREFERRED EMBODIMENT

Figure 1:
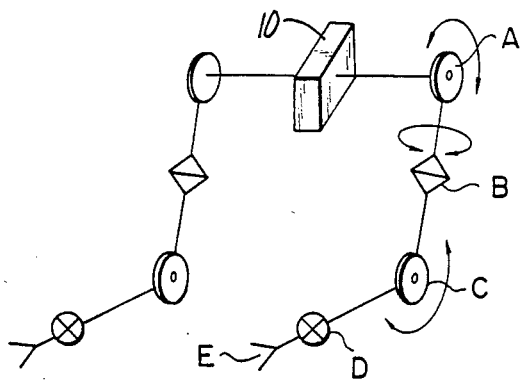
FIG. 1 is an illustration showing an exemplary joint mechanism arrangement of a two-arm manipulator in model fashion.

With reference to the attached drawings, the shoulder mechanism of a two-arm manipulator according to the present invention will be described hereinbelow:

FIG. 1 shows a schematic diagram of a two-arm manipulator which includes a frame 10, a shoulder joint A for pivotably actuating an upper arm, an upper arm twist joint B for rotatably actuating the upper arm, an elbow joint C for pivotably actuating a lower arm, a hand joint D for pivotably and/or rotatably actuating a hand, and a finger joint E.

Figure 2:
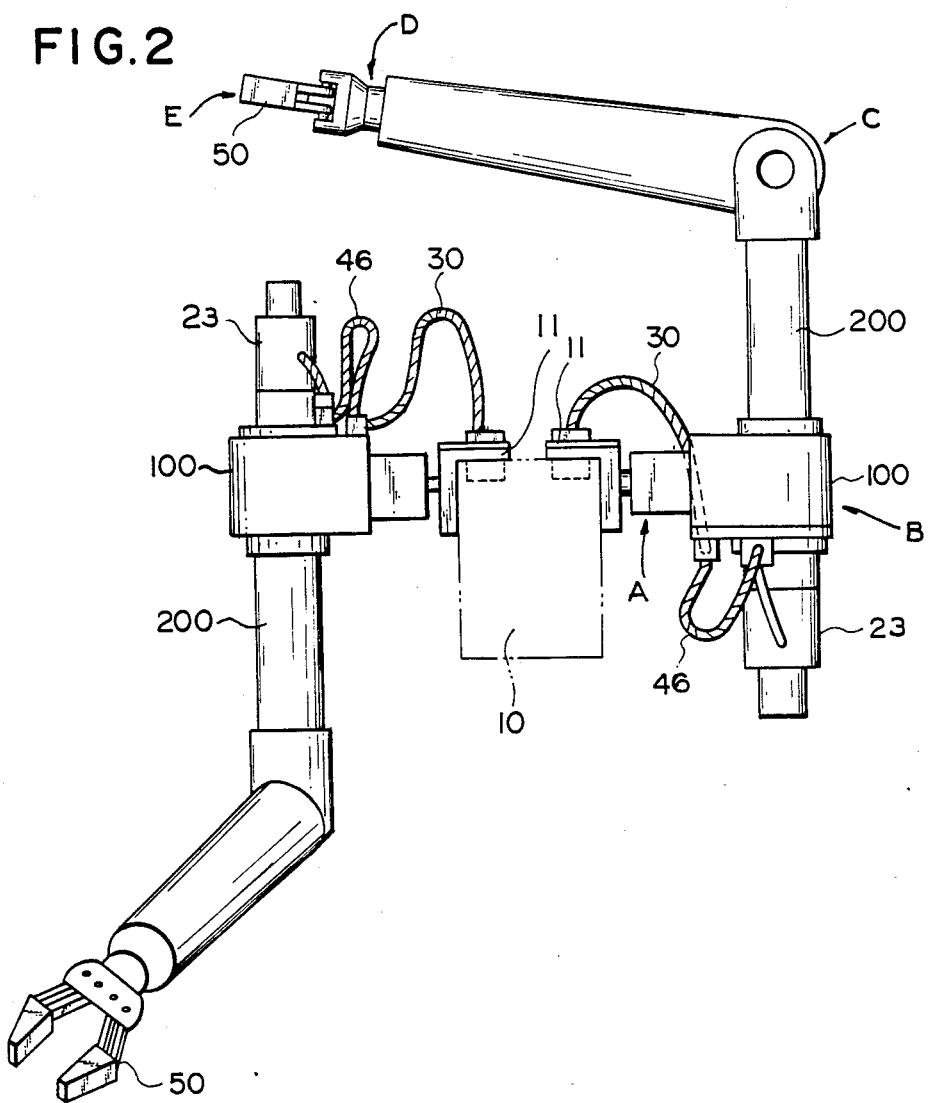
FIG. 2 is a schematic front view showing a part of shoulder mechanism of a two-arm manipulator according to the present invention.

FIG. 2 shows a two-arm type manipulator in which two manipulator arms 200 are arranged on both the sides of a frame 10. As shown in the same drawing, a manipulator shoulder section 100 is removably fixed to the frame 10 by means of a mounting member 11, and motors (only one of which is shown at 23) for actuating joints of the shoulder section 100 and the elbow section are also removably attached onto the manipulator shoulder section 100. In addition, a wire cable 30 is removably connected between the mounting member 11 and the manipulator shoulder section 100, and another lead wire cable 46 is also removably connected between the manipulator shoulder section 100 and the motor 23. Since both the cables 30 and 46 are flexible, the motors can be moved freely when the manipulator shoulder section 100 is pivoted or the manipulator upper arm is rotated. On the other hand, as shown in FIG. 2, both the manipulators are so designed that a hand section 50 of one manipulator arm is accessible to the motors of the other manipulator shoulder section 100.

In the two-arm manipulator as constructed above, in case one of the motors develops trouble or any one of the wire cables is disconnected, a normal manipulator is allowed to access to a disabled motor, as shown in FIG. 2, and bolts fixing the motor are loosened with a motor-driven tool such as an impact wrench (not shown) to remove the motor and thereafter to replace it with a new one. In the same way, a disabled cable can be replaced with a new cable.

The above embodiment and various joints A, B and C will be described in further detail with reference to FIGS. 3 to 6.

Figure 6:
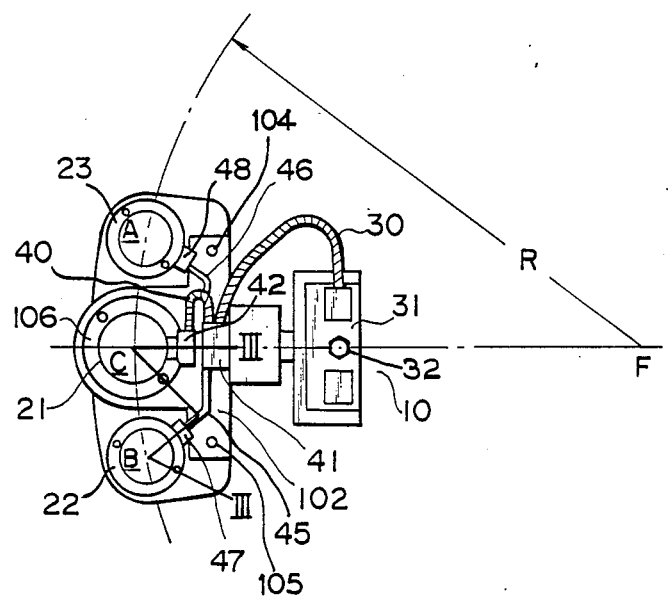
FIG. 6 is a top view showing the shoulder mechanism of the manipulator according to the present invention.

As depicted in FIG. 6, three motors 21, 22 and 23 are arranged on the manipulator shoulder section. The motor 21 serves to actuate the lower arm pivotal motion mechanism C; the motor 22 serves to actuate the upper arm rotational motion mechanism B; the motor 23 serves to actuate the arm pivotal motion mechanism A, respectively.

Figure 3:
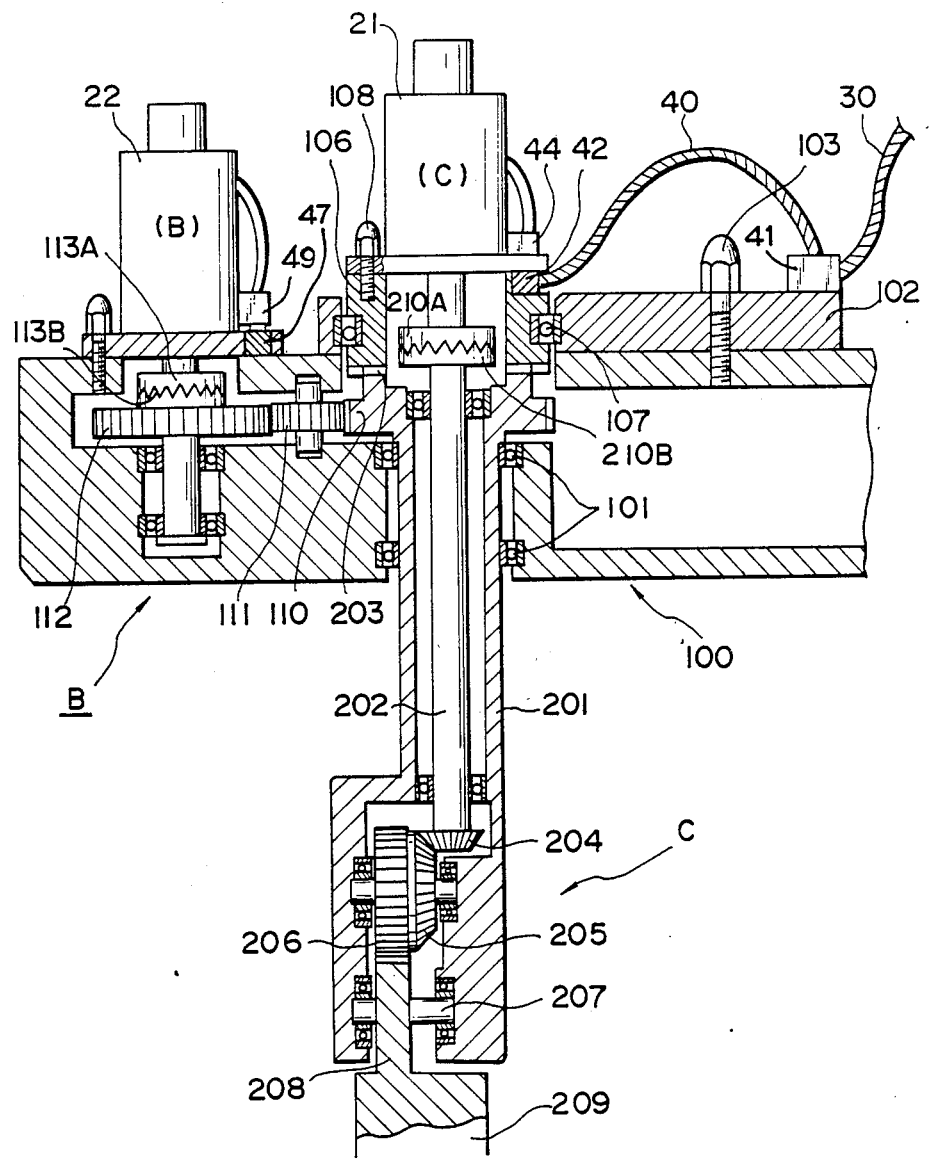
FIG. 3 is an enlarged cross-sectional view taken along the line III-III of FIG. 6 showing a part of shoulder mechanism (an upper arm rotational motion mechanism B and a lower arm pivotal motion mechanism C) of the two-arm manipulator according to the present invention.
Figure 4:
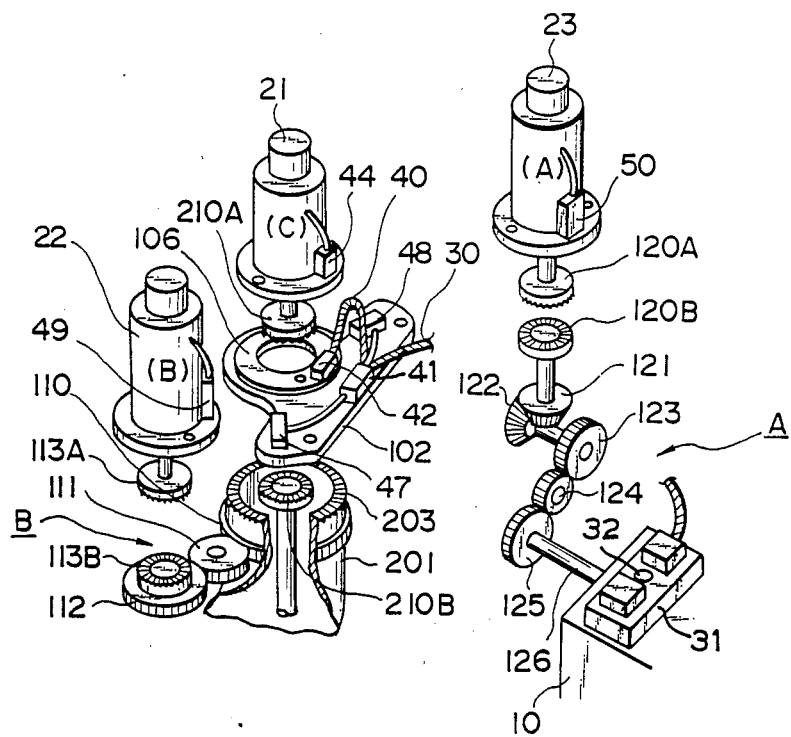
FIG. 4 an exploded view showing the major part of the shoulder mechanism (an arm pivotal motion mechanism A, an upper arm rotational motion mechanism B, and a lower arm pivotal motion mechanism C) of the two-way manipulator according to the present invention.

As shown in FIGS. 3 and 4, an upper arm 201 is rotatably supported by a manipulator shoulder section 100 via two bearings 101. The upper arm 201 is of hollow, through which a transmission shaft 202 is passed being supported by the upper arm 201 via two bearings. On the top end surface of the upper arm 201, a gear 203 is formed, and a clutch gear 210B is provided on the upper end of the transmission shaft 202. On the other hand, a connector plate 102 is mounted on the upper surface of the manipulator shoulder section 100 and fixed by bolts 103 inserted in bolt holes 104 and 105. A disc 106 is rotatably mounted on the connector plate 102 via a bearing 107, and a motor 21 is fixed on this disc 106 by bolts 108. On the lower surface of the disc 106, a gear is removably so formed as to mesh with the gear 203 of the upper arm 201. Further, an output shaft of the motor 21 is disposed so as to pass through the disc 106, and a clutch gear 210A disengageably engaged with the clutch gear 210B of the transmission shaft 201 is mounted under the disc 106. Further, under the transmission shaft 201, a bevel gear 204 is attached, and another bevel gear 205 in mesh with the bevel gear 204 is attached to the lower portion of the upper arm 201. A spur gear 206 is fixed integral with this bevel gear 205. At the lower end of the upper arm 201, an elbow section joint shaft 207 is disposed. This elbow section joint shaft 207 is fixed to a spur gear 208 in mesh with the spur gear 206. This spur gear 208 is fixed to the upper end of the lower arm 209 integral therewith. Therefore, under the conditions that the upper arm 201 is not pivoted, when the transmission shaft 202 is rotated by the motor 21 via the clutch gears 210A, 210B, the bevel gears 204 and 205 and the spur gears 206 and 207 rotate to pivot the lower arm 209 with the elbow section joint shaft 207 as its center.

On the other hand, within the manipulator shoulder section 100, a gear 110 is formed on the outer circumference of the upper portion of the upper arm 201, and an idle gear 111 in mesh with this gear 110 and a spur gear 112 in mesh with this idle gear 111 are housed within the manipulator shoulder section 100. A clutch gear 113B is coaxially fixed to this spur gear 112, and a motor 22 having a clutch gear 113A engageable with this clutch gear 113B is fixed on the upper surface of the manipulator shoulder section by bolts. Therefore, when the spur gear 112 and the idle gear 111 are rotated via the clutch gears 113A, 113B by the motor 22, the upper arm 201 in mesh with this idle gear 111 is rotated or pivoted, so that the disc 106 and the motor 21 are also rotated.

Further, as shown in FIG. 4, a motor 23 is fixed on the manipulator shoulder section 100, and a clutch gear 120A is disposed on the output shaft of this motor 23. A clutch gear 120B in mesh with this clutch gear 120A is housed within the manipulator shoulder section 100. This clutch gear 120B is engaged via bevel gears 121 and 122 and the spur gears 123 and 124 with a spur gear 125 fixed to a pivotal shaft 126 fixed to the frame 10. Therefore, when the motor 23 is activated to rotate the bevel gears 121 and 122 and the spur gears 123 and 124 via the clutch gears 120A, 120B, the manipulator shoulder section 100 pivots with the pivotal shaft 126 as its center.

Power and signals are supplied to these motors 21, 22 and 23 via the wire cables. In more detail, as shown in FIG. 6, the cable 30 is connected between the frame 10 and a connector plate 102 through two fixtures 31 and 41, while the cable 40 is connected between the connector plate 102 and the disc 106 through a fixture 41 and a receptacle 42. This receptacle 42 is connected with or disconnected from the connector 44 of the motor 21. Further, two wires 45 and 46 branched from the fixture 41 are arranged, being fixed on the connector plate 102, to each of receptacles 47 and 48 which are removably connected to the connectors 49 and 50 of the motors 22 and 23. Therefore, when the motor 23 is activated to pivot the manipulator shoulder section 100 with the pivotable shaft 126 as its center, the cable 30 will be bent. On the other hand, when the motor 22 is activated to rotate the upper arm 201 and the motor 21 (this range is finite in revolution, in usual, as about 120 degrees), the cable 40 will be bent.

Further, in FIG. 6, the motors 21, 22 and 23 are located on a radius of R roughly equal to the length of the lower arm 209 with a center F of the other manipulator shoulder section as its center, so that the hand is accessible to all the motors 21, 22 and 23.

In the above embodiment thus constructed, in case the motors 21, 22 and 23 develop trouble, the motors are removed and replaced as follows: For instance, where some trouble occurs in the motor 21, the other manipulator arm is brought near the motor 21 as in FIG. 2; the bolts 108 are loosened; the motor 21 is removed upward away from the disc 106; then the clutch gears 210A, 210B are disengaged and the receptacle 42 is disengaged from the connector 44. To mount a new motor, a new motor 21 is mounted on the disc 106; the clutch gears 210A, 210B are engaged; the motor 21 is rotated to match the position of the receptacle 42 with that of the connector 44 before connection between the two; and then the bolts are fastened. The same is applied to the replacement of other motors 22 and 23. However, although not shown in the above embodiment, it may be possible to use a guide pin to securely locate each of the motors 21, 22 and 23.

Figure 5:
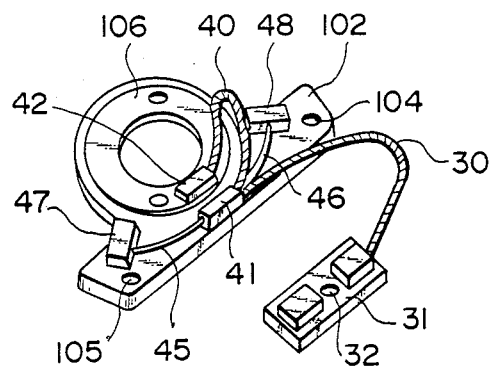
FIG. 5 is a perspective view showing the lead wire unit of the shoulder mechanism according to the present invention.

In case cables 30 and 40 are disconnected, a set of cables is replaced collectively, as shown in FIG. 5. That is, the bolts inserted into the bolt holes 32 of the metal fixture 31 and the bolts inserted into the bolt holes 104 and 105 of the connector 102 are loosened, and then the cables 30 and 40 are removed together with the metal fixture 31 and the connector plate 102. Thereafter, the cables 30 and 40 can be replaced with new ones by mounting the connector plate 102 on the manipulator shoulder section 100, fastening bolts, mounting the metal fixture 31 on the frame 10 and fastening bolts. In this case, it is also possible to use guide pins for securely locating these connector plates 102 and the metal fixtures 31.

As explained in detail on the basis of the embodiment, in the two-arm type manipulator of the present invention, since the driving machines such as motors for actuating the joints are removably mounted and further removable and replaceable by the aid of the other manipulator, it is possible to replace any defective driving machines with new ones by the use of the non-defective manipulator in self-maintenance fashion. Therefore, the maintenance work can be made from a remote position. The present invention is reliable when applied to atomic facilities contaminated by radioactivity.

What is claimed:

1. A two-arm manipulator comprising:
    a frame;
    a first manipulator arm having a shoulder movably mounted to the frame and a first hand provided with fingers for grasping and moving an object;
    a first power unit detachably mounted on the shoulder of the first manipulator arm for driving the first manipulator arm;
    a second manipulator arm having a shoulder mounted movably to the frame and a second hand provided with fingers for grasping and moving an object;
    a second power unit detachably mounted on the shoulder of the second manipulator arm for driving the second manipulator arm;
    the first manipulator arm having a length for bringing the first hand to a position at which the first hand is accessible to the second power unit for replacing the second power unit with a first new power unit; and
    the second manipulator arm having a length for bringing the second hand to a position at which the second hand is accessible to the first power unit for replacing the first power unit with a second new power unit.

2. The two-arm manipulator as set forth in claim 1 wherein the first power unit has a first output gear which comes into mesh engagement with a first input gear of the first manipulator arm for transmitting mechanical power from the first power unit to the first manipulator arm when the first power unit is mounted on the shoulder of the first manipulator arm, and wherein the second power unit has a second output gear which comes into mesh engagement with a second input gear of the second manipulator arm for transmitting mechanical power from the second power unit to the second manipulator arm when the second power unit is mounted on the shoulder of the second manipulator arm.

3. The two-arm manipulator as set forth in claim 1 wherein each of the first and second power units is connected electrically through a detachable connector to a power source, and the detachable connector includes a first connector plate removably fixed on the frame by at least one bolt, a second connector plate removably fixed to the corresponding shoulder by at least one bolt, and a lead wire cable connected between the first and second plates.

4. A two-arm manipulator comprising first and second shoulder mechanisms mounted on a frame for manipulating first and second manipulator arms independently, each of said shoulder mechanisms having at least one power unit for actuating at least one joint mechanism arranged in said shoulder mechanism, each said power unit being removably mounted on said corresponding shoulder mechanism, said first arm being accessible to the second shoulder mechanism, said second arm being accessible to the first shoulder mechanism, and a detachable connector electrically connecting said power unit to said frame, said detachable connector including a first connector plate removably fixed to the frame by at least one bolt, a second connector plate removably fixed to the shoulder section with at least one bolt, and a lead wire cable connected between said first and second connector plates.

5. The two-arm manipulator as set forth in claim 4, wherein said power unit is removably linked to the shoulder mechanism via a gear clutch.

6. The two-arm manipulator as set forth in claim 4, wherein said power unit is a motor and the shoulder mechanism linked to said power unit is a power transmission mechanism arranged within an upper arm section of said manipulator.

7. The two-arm manipulator as set forth in claim 4, at least one lead wire cable is removably connected between said at least one power unit and said frame.

* * * * *